Jan. 11, 1927. 1,613,997
J. HANSON
WEED ERADICATOR
Filed Oct. 27, 1924   3 Sheets-Sheet 1

Inventor
John Hanson

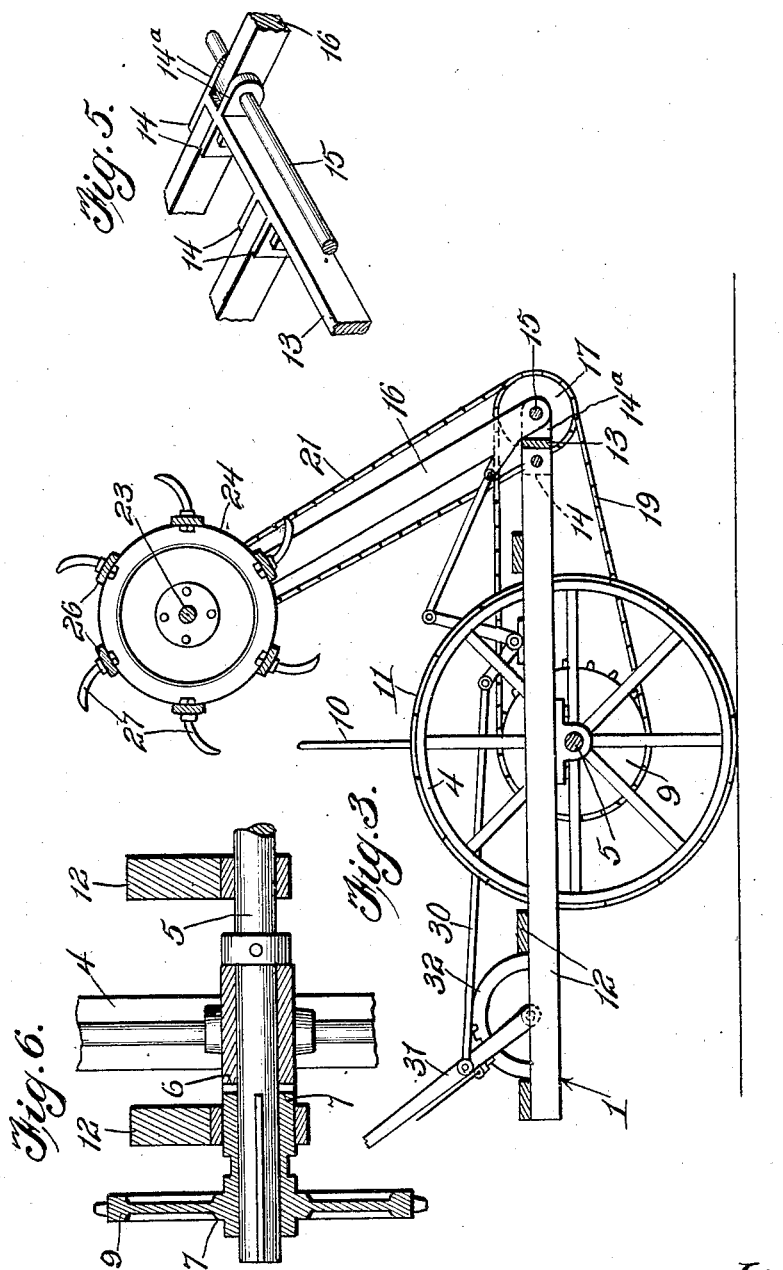

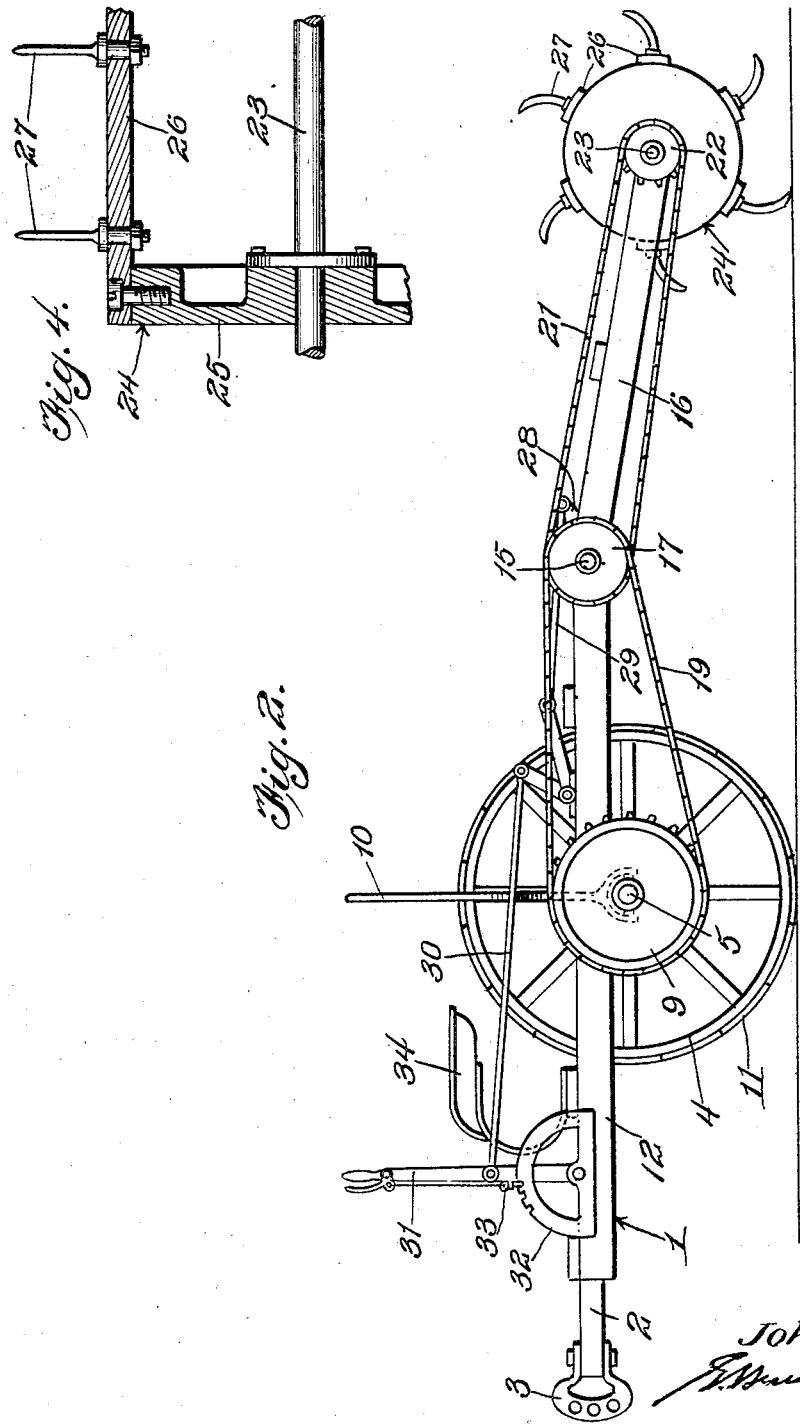

Patented Jan. 11, 1927.

1,613,997

UNITED STATES PATENT OFFICE.

JOHN HANSON, OF GRAFTON, NORTH DAKOTA.

WEED ERADICATOR.

Application filed October 27, 1924. Serial No. 746,133.

The object of the invention is to provide a machine of the kind indicated in which the toothed beater roll is carried by an auxiliary frame capable of swinging movement on the main frame so that the beater roll may be elevated out of contact with the ground by the operator, or raised clear of the ground and retained in that position with the auxiliary frame in overhanging relation to the main frame.

With this object in view, the invention consists in a construction and combination of parts of which a preferred embodiment is illustrated in the accompanying drawings, wherein:—

Figure 2 is a view in side elevation of the same, showing the driving means for the revoluble beater.

Figure 3 is a longitudinal sectional view on line 3—3 of Figure 1, showing the beater carrying frame elevated.

Figure 4 is an enlarged detail sectional view of a portion of the beater.

Figure 5 is an enlarged detail view of the pivotal connection between the main or wheel supported frame section and the beater carrying frame section.

Figure 6 is a detail sectional view through the bearings of the frame.

Figure 1:
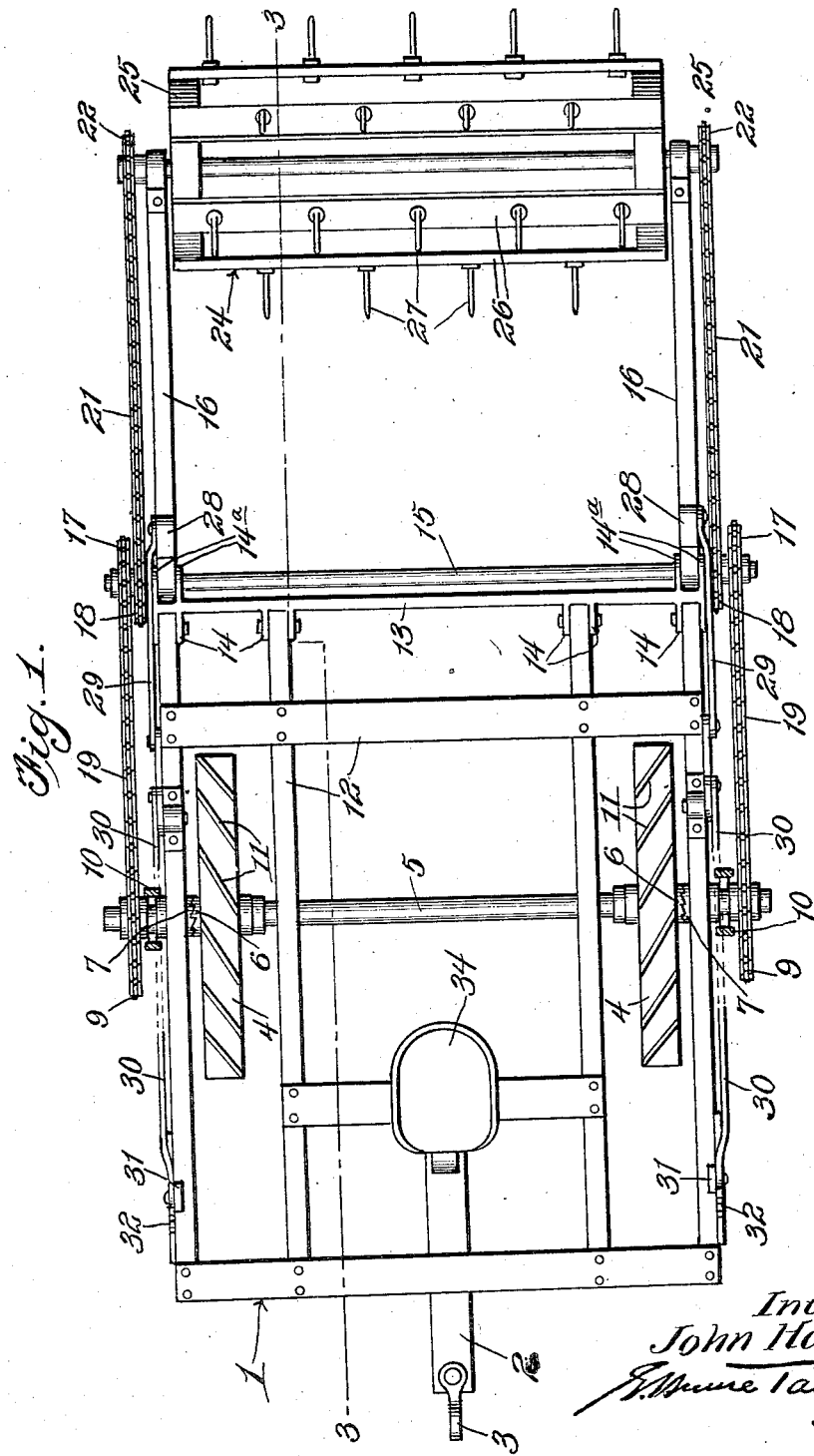
Figure 1 is a plan view of the invention.

Referring to the drawings, 1 designates the main or wheel supported frame section which may be constructed of any suitable material, preferably a sufficiently light weight metal. This frame may be any suitable width, preferably five feet more or less, in order to accommodate four or more draft animals which may be hitched to the tongue 2 in the usual manner. The tongue has a suitable clevis or other connection 3 to facilitate the connection of the draft equalizer (not shown) to which the draft animals may be hitched.

Supporting wheels 4 are provided and are mounted upon an axle 5 which is mounted in suitable bearings on the frame section 1. The hubs of the supporting wheels 4 have clutches 6 with which the clutch members 7 (which are slidable upon the hubs or sleeves 8 of the sprocket wheels 9) engage, so that the sprocket wheels 9 may be operatively connected with and from the axle. The clutch members are operated in the usual manner, for instance by means of the levers 10. The supporting drive wheels have on their peripheries angularly disposed lugs 11 to insure that the wheels take hold in the soil when traversing the field.

The main frame comprises, as shown, a plurality of beams 12, the rear terminal portions of which are connected by a metallic bar 13 which has spaced lugs 14 to straddle the ends of the beams of the main frame. These lugs are bolted or otherwise secured to the beams of the main frame. Projecting rearwardly of the bar are spaced lugs or arms 14$^a$ between which the sides of a beater carrying or auxiliary frame are pivotally mounted on a fulcrum rod or intermediate drive shaft 15.

The beater carrying frame section 16 is so mounted as to permit the same to tilt so as to disengage the teeth or tines on the beater from engagement with the soil when the sprockets 9 are out of gear. The beater carrying or auxiliary frame is constructed of suitable light metal and can also be tilted upwardly and forwardly so that its beater may overlie the main frame, thereby relieving the greater part of the weight on the draft animals. The sides of the auxiliary or beater carrying frame section engage with the corners of the crotches between the lugs or arms 14$^a$, thereby retaining the auxiliary or beater carrying frame section in an inclined position when tilted upwardly and forwardly over the main frame.

The fulcrum rod or intermediate drive shaft 15 has sprockets 17 and 18 on its opposite ends. The former are connected by chains 19 with the sprockets 9 while the latter are operatively connected by chains 21 with the sprockets 22 which are movable with the shaft 23 of the beater 24. The beater 24 is also movable with the shaft 23 so that, when the sprockets 9 are driven, they, in turn, drive the sprockets 17 and 18, the latter acting to drive the beater so that its tines or teeth (which are curved downwardly and rearwardly) may dig or gouge sufficiently under the surface of the soil in order to uproot the long stringy roots of weeds, in fact, so upturn them on the top of the soil as to permit the stringy roots to thoroughly dry out or decay. Obviously, in either case the soil may be subsequently harrowed in order to remove such trash or dried weeds. It is apparent that the fulcrum rod or intermediate drive shaft not only transmits power to the beater 24 but also constitutes a support for the auxiliary or beater carrying frame.

The beater 24 comprises a cylinder-like open structure consisting of the end pieces 25 and the longitudinal bars 26 from which the tines or teeth 27 radially extend. However, these teeth or tines 27 are curved rearwardly sufficiently to dig or gouge under the surface of the soil so as to thoroughly uproot the weeds in such wise as to not only break the earth from the roots but also toss the weeds on the top of the soil where they can dry or decay and subsequently be removed either by harrowing or otherwise.

Near the rear end of the auxiliary or beater carrying frame section, upstanding arms 28 are provided and connected to these arms are rods 29 which, through bell crank levers 29', connect with the rods 30. The rods 30 are, in turn, pivotally connected to levers 31 by which the rods may be operated for tilting the auxiliary or beater carrying frame section slightly upwardly in order that the forks or teeth on the beater can be disengaged from the soil, that is, when the sprocket wheels 9 are out of gear. Suitable racks or quadrants 32 are provided, and carried by the levers are hand grip operated dogs 33 which cooperate with the teeth of the racks or quadrants for the purpose of holding the levers in different adjusted positions, so as to hold the beater raised out of engagement with the ground. A suitable operator's seat 34 is supported upon the main frame section, the location being such as to permit the operator to manipulate the levers and to operate the clutches.

The invention having been set forth, what is claimed is:

A machine for the purpose indicated comprising a wheel carried main frame, an auxiliary frame pivotally connected at its forward end to the rear end of the main frame, a toothed beater carried at the remote end of the auxiliary frame, the latter being provided with upstanding arms adjacent its pivotal connection with the main frame, driving connections between the wheels of the main frame and the beater, and frame actuating means consisting of a latch controlled hand lever, and operative connections between the hand lever and the arms to effect elevation of the auxiliary frame by means of the lever, the arms, in the extreme elevated position of the auxiliary frame, abutting the upper side of the main frame at its rear end.

In testimony whereof he affixes his signature.

JOHN HANSON.